United States Patent
Kondo et al.

(10) Patent No.: US 12,205,617 B2
(45) Date of Patent: Jan. 21, 2025

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Yosuke Kondo, Kanagawa (JP); Syosuke Maruyama, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/537,486

(22) Filed: Dec. 12, 2023

(65) Prior Publication Data

US 2024/0296869 A1 Sep. 5, 2024

(30) Foreign Application Priority Data

Mar. 2, 2023 (JP) .................................. 2023-031626

(51) Int. Cl.
| | |
|---|---|
| *G11B 20/12* | (2006.01) |
| *G11B 5/09* | (2006.01) |
| *G11B 19/04* | (2006.01) |
| *G11B 20/00* | (2006.01) |
| *G11B 20/18* | (2006.01) |

(52) U.S. Cl.
CPC .......... *G11B 20/00637* (2013.01); *G11B 5/09* (2013.01); *G11B 19/045* (2013.01); *G11B 20/00666* (2013.01); *G11B 20/00949* (2013.01); *G11B 20/1252* (2013.01); *G11B 20/1879* (2013.01); *G11B 2020/1232* (2013.01); *G11B 2020/1843* (2013.01); *G11B 2020/185* (2013.01); *G11B 2220/2516* (2013.01)

(58) Field of Classification Search
CPC ....... G11B 5/09; G11B 20/10; G11B 20/1407; G11B 20/12; G11B 5/59633; G11B 20/10222; G11B 20/18
USPC .......................................................... 260/48
See application file for complete search history.

(56) References Cited

U.S. PATENT DOCUMENTS

| 5,925,144 A | 7/1999 | Sebaa | |
|---|---|---|---|
| 7,020,811 B2 | 3/2006 | Byrd | |
| 8,879,372 B1 * | 11/2014 | Painter | ................. G11B 7/0906 369/124.01 |
| 11,373,723 B2 | 6/2022 | Yang | |

* cited by examiner

*Primary Examiner* — Nabil Z Hindi
(74) *Attorney, Agent, or Firm* — Maier & Maier, PLLC

(57) ABSTRACT

According to the embodiment, an HDC receives a plurality of data segments from a host, and executes generation and addition of a first code and output of a data segment to which the first code is added to each data segment. An HDC calculates exclusive OR with respect to the first codes, and outputs obtained first information. The RWC performs data conversion and calculation of exclusive OR on the plurality of data segments to which the first code is added, and outputs the plurality of data segments after the data conversion and a track parity obtained by the calculation of the exclusive OR. The RWC acquires the first code from the plurality of data segments. The RWC calculates exclusive OR with respect to a group of the second codes which are the acquired first codes to acquire second information. The RWC compares the first information with the second information.

16 Claims, 12 Drawing Sheets

MAGNETIC DISK DEVICE

CROSS-REFERENCE TO RELATED APPLICATIONS

This application is based upon and claims the benefit of priority from Japanese Patent Application No. 2023-031626, filed on Mar. 2, 2023; the entire contents of which are incorporated herein by reference.

FIELD

Embodiments described herein relate generally to a magnetic disk device.

BACKGROUND

There is a magnetic disk device having a function of protecting data written to each track in units of tracks. A sector for recording parity is provided in the track. A sector for recording a parity is referred to as a parity sector. A sector for recording host data is referred to as a data sector. A parity generated from host data written in all data sectors in a track is written in a parity sector of the track. With this mechanism, the host data stored in all the data sectors in the track is protected by the parity stored in the parity sector until the host data in any of the data sectors is updated.

DETAILED DESCRIPTION

According to the present embodiment, the magnetic disk device is connectable to a host. The magnetic disk device includes a magnetic disk, a first circuit block, a second circuit block, and a magnetic head. The magnetic disk is provided with a track including a plurality of first sectors and a second sector. The first circuit block receives a plurality of first data segments written in the plurality of first sectors from the host, executes generation of a first code, addition of the first code, and output of the first data segment to which the first code is added for each of the plurality of first data segments. The first circuit block calculates exclusive OR with respect to a group of the first codes generated from each of the plurality of first data segments, and outputs first information that is information obtained by calculation of the exclusive OR with respect to the group of the first codes. The second circuit block receives a plurality of second data segments which is the plurality of first data segments each to which the first code is added and output from the first circuit block, and the first information output from the first circuit block. The second circuit block executes data conversion and output of a third data segment which is the second data segment after the data conversion on each of the plurality of second data segments. The second circuit block calculates exclusive OR with respect to the plurality of third data segments generated by the data conversion with respect to each of the plurality of second data segments, and outputs a parity which is information obtained by calculating the exclusive OR with respect to the plurality of third data segments subsequently to the output of the plurality of third data segments. The second circuit block acquires the first code from each of the plurality of second data segments, and calculates exclusive OR with respect to a group of second codes which are the first codes acquired from each of the plurality of second data segments. The second circuit block compares second information which is information obtained by the calculation of the exclusive OR with respect to the group of second codes with the first information, and outputs a result of comparison between the second information and the first information. The magnetic head writes the plurality of third data segments output from the second circuit block to the plurality of first sectors and writes the parity output from the second circuit block to the second sector.

Hereinafter, a magnetic disk device according to an embodiment will be described in detail with reference to the accompanying drawings. Note that the present invention is not limited by this embodiment.

EMBODIMENT

Figure 1:
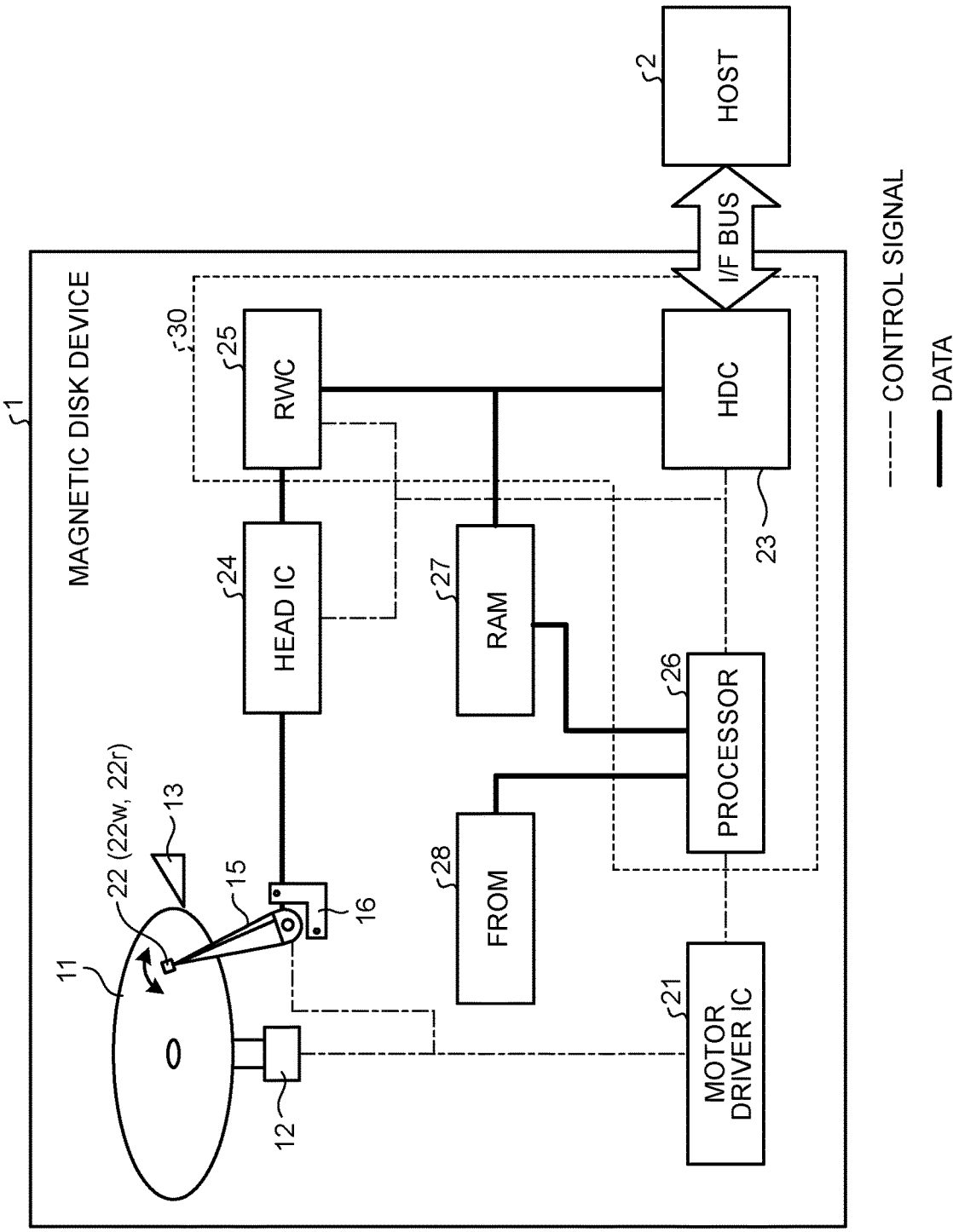
FIG. 1 is a schematic diagram illustrating an example of a configuration of a magnetic disk device according to an embodiment.

FIG. 1 is a schematic diagram illustrating an example of a configuration of a magnetic disk device 1 according to an embodiment.

The magnetic disk device 1 is connectable to a host 2. The magnetic disk device 1 can receive an access command from the host 2 when connected to the host 2. The access command is a write command, a read command, or the like.

The magnetic disk device 1 includes a magnetic disk 11 having a magnetic layer formed on the surface. The magnetic disk device 1 writes data to the magnetic disk 11 or reads data from the magnetic disk 11 in response to the access command.

The access command includes a logical address. The magnetic disk device 1 provides a logical address space to the host 2. The logical address indicates a position in the address space. The host 2 designates a position where data is written or a position where data is read by using the logical address. That is, the logical address is position information designated by the host 2. Note that the logical address is referred to as a logical block address (LBA).

Data is written and read via a magnetic head 22. In addition to the magnetic disk 11, the magnetic disk device 1 includes a spindle motor 12, a ramp 13, an actuator arm 15, a voice coil motor (VCM) 16, a motor driver integrated circuit (IC) 21, a magnetic head 22, a hard disk controller (HDC) 23, a head IC 24, a read/write channel (RWC) 25, a processor 26, a RAM 27, and a flash read only memory (FROM) 28.

The HDC 23 is an example of a first circuit block. The RWC 25 is an example of a second circuit block.

The magnetic disk 11 is rotated at a predetermined rotation speed by a spindle motor 12 attached coaxially. The spindle motor 12 is driven by the motor driver IC 21.

The processor 26 controls the rotation of the spindle motor 12 and the rotation of the VCM 16 via the motor driver IC 21.

The magnetic head 22 writes and reads information to and from the magnetic disk 11 by a write core 22w and a read core 22r provided in the magnetic head 22. In addition, the magnetic head 22 is attached to a distal end of the actuator arm 15. The magnetic head 22 is moved in the radial direction of the magnetic disk 11 by the VCM 16. Note that a plurality of one or both of the write core 22w and the read core 22r provided in the magnetic head 22 may be provided for a single magnetic head 22.

For example, when the rotation of the magnetic disk 11 is stopped, the magnetic head 22 is moved onto the ramp 13. The ramp 13 is configured to hold the magnetic head 22 at a position spaced apart from the magnetic disk 11.

The head IC 24 amplifies and outputs a signal read from the magnetic disk 11 by the magnetic head 22 during the read operation, and supplies the signal to the RWC 25. In addition, the head IC 24 amplifies a signal corresponding to the data to be written supplied from the RWC 25 and supplies the amplified signal to the magnetic head 22 during the write operation.

The HDC 23 controls transmission and reception of data with the host 2 via the I/F bus.

The RAM 27 is used as a buffer for data to be written to the magnetic disk 11 and data read from the magnetic disk 11.

In addition, the RAM 27 is used as an operation memory by the processor 26. The RAM 27 is used as a region in which firmware is loaded and a region in which various types of management data are temporarily stored.

The RAM 27 includes a volatile memory capable of high-speed operation. The type of the memory constituting the RAM 27 is not limited to a specific type. The RAM 27 may be configured by, for example, a dynamic random access memory (DRAM), a static random access memory (SRAM), or a combination of these.

The RWC 25 performs data conversion such as error correction coding and modulation coding on the data to be written supplied from the HDC 23 in units of sectors, and supplies the data after the data conversion to the head IC 24. In addition, the RWC 25 performs processing such as error correction and demodulation in units of sectors on the signal read from the magnetic disk 11 and supplied from the head IC 24, and outputs the processed signal to the HDC 23 as digital data.

The processor 26 is, for example, a central processing unit (CPU). The RAM 27 and the flash read only memory (FROM) 28 are connected to the processor 26.

The FROM 28 is a nonvolatile memory in which firmware (program data), various operation parameters, or the like are stored in the FROM 28.

The processor 26 performs overall control of the magnetic disk device 1 according to the firmware stored in the FROM 28. For example, the processor 26 loads firmware from the FROM 28 to the RAM 27, and executes control of the motor driver IC 21, the head IC 24, the RWC 25, the HDC 23, or the like according to the loaded firmware.

The firmware program may be stored in the magnetic disk 11. A part or all of the functions of the processor 26 may be implemented by a hardware circuit such as a field-programmable gate array (FPGA) or an application specific integrated circuit (ASIC).

The configuration including the HDC 23, the RWC 25, and the processor 26 can also be regarded as a controller 30 that controls the operation of the magnetic disk device 1. In addition to these components, the controller 30 may include other components (for example, the RAM 27, the FROM 28, or the like).

In addition, the firmware program may be stored in the magnetic disk 11. A part or all of the functions of the processor 26 may be implemented by a hardware circuit such as a field-programmable gate array (FPGA) or an application specific integrated circuit (ASIC).

Note that the number of the magnetic disks 11 included in the magnetic disk device 1 is not limited to one. In addition, the magnetic disk device 1 may include actuator arms 15 and magnetic heads 22 in a number corresponding to the number of magnetic disks 11. In addition, in a case where the magnetic disk device 1 includes the plurality of magnetic heads 22, the plurality of magnetic heads 22 may be integrally moved, or the plurality of magnetic heads 22 may constitute a plurality of groups that are independently movable.

Figure 2:
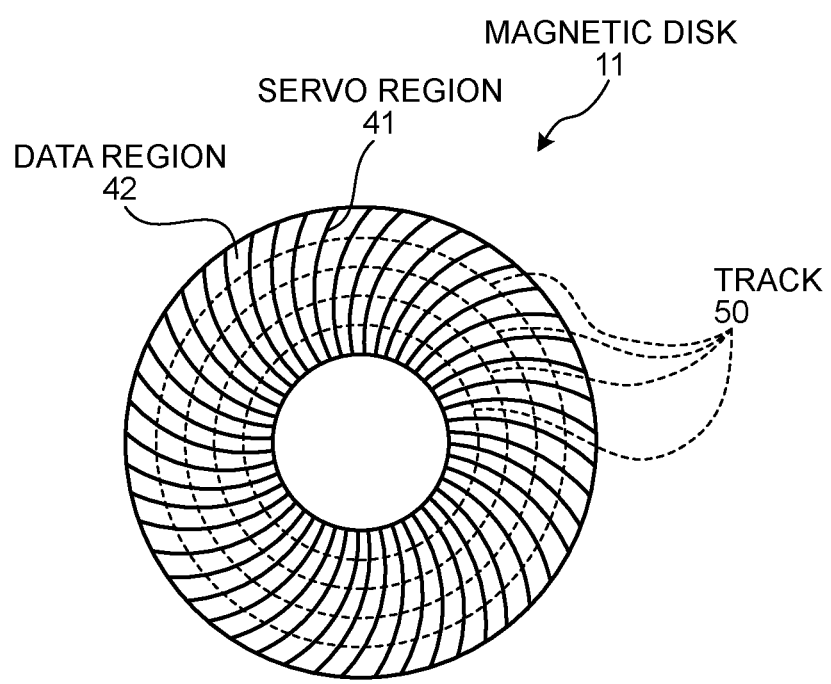
FIG. 2 is a diagram illustrating an example of a configuration of a magnetic disk according to the embodiment.

FIG. 2 is a diagram illustrating an example of a configuration of the magnetic disk 11 according to the embodiment. Servo data used for positioning the magnetic head 22 is written to the magnetic layer formed on the surface of the magnetic disk 11 by, for example, a servo writer or self-servo write (SSW).

FIG. 2 illustrates servo regions 41 radially arranged as an example of the arrangement of the servo regions in which the servo data is written. In the circumferential direction, a space between the two servo regions 41 is a data region 42 where data can be written. A plurality of concentric tracks 50 is provided in the radial direction of the magnetic disk 11. A plurality of sectors in which data of a predetermined size is written is provided in the data region 42 on the track 50. The predetermined size is a sector size.

The servo data includes a servo mark, a gray code, a burst pattern, and a post code. The servo mark indicates the start of the servo data. The gray code includes an ID for identifying each track 50 provided in the magnetic disk 11, that is, a track number, and an ID for identifying each servo sector (that is, the servo region 41) on the track 50, that is, a servo sector number. The burst pattern is data used to detect the amount of positional deviation of the track indicated by the track number included in the gray code from the center. The track number included in the gray code is given as, for example, an integer value, and it is possible to obtain an offset amount of decimal places based on the position indicated by the track number by demodulating the burst pattern. That is, the current position of the magnetic head 22 in the radial direction is obtained by demodulating the burst pattern. The post code is data for correcting positional deviation of the shape of the track 50 defined by the gray code and the burst pattern from the ideal shape of the track 50.

When writing data to the magnetic disk 11 or reading data from the magnetic disk 11, the controller 30 executes positioning of the magnetic head 22, that is, seek control and tracking control based on servo data read from the servo region 41 by the magnetic head 22.

The controller 30 executes data processing on data (referred to as host data) received from the host 2 for each data segment having a size corresponding to the sector size, and writes each data segment after the data processing in the sector.

Figure 3:
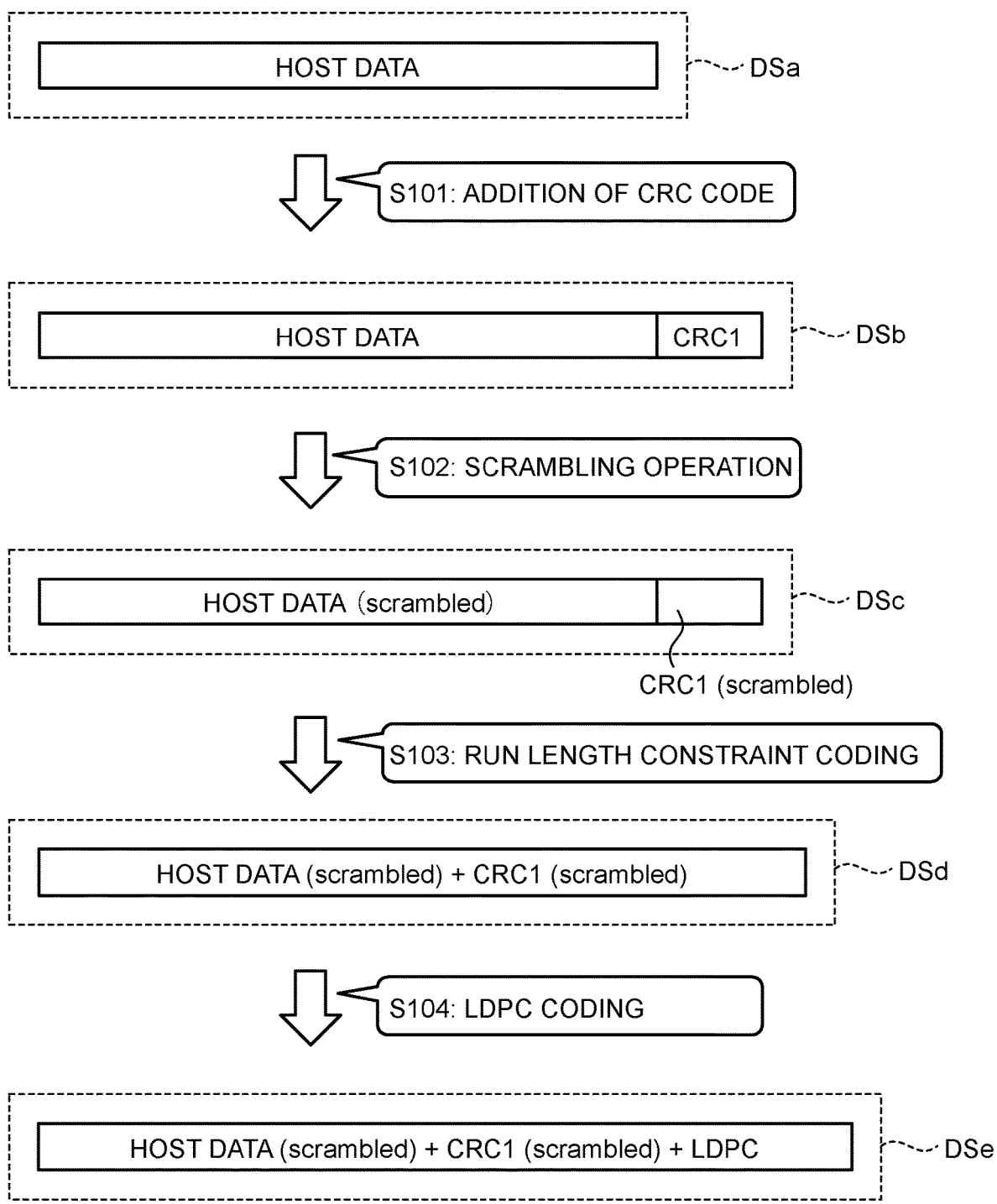
FIG. 3 is a diagram for describing an example of data processing executed by a controller according to the embodiment.

FIG. 3 is a diagram for describing an example of data processing executed by the controller 30 according to the embodiment. Note that a data segment of host data before data processing is referred to as a data segment DSa.

The HDC 23 generates a cyclic redundancy check (CRC) code from the data segment DSa and adds the CRC code to the data segment DSa (S101).

Hereinafter, the CRC code generated by the processing of S101 is referred to as a first code CRC1. The data segment DSa to which the first code CRC1 is added is referred to as a data segment DSb.

The RWC 25 scrambles (S102) the data segment DSb. In addition, the RWC 25 performs, as an example of modulation and coding, run length constraint coding (S103) on the data segment DSb under a condition where maximum transition run (MTR) is constrained. In addition, the RWC 25 executes low density parity check (LDPC) coding (S104) on the data segment DSb as an example of error correction coding. Note that the execution order of the processing in steps S102 to S103 may not be as described above.

Note that scrambling, run length constraint coding, and LDPC coding are examples of data conversion executed at the RWC 25.

The data segment DSb after scrambling is referred to as a data segment DSc. In scrambling, the size of the data segment does not change. Therefore, the size of the data segment DSc is equal to the size of the data segment DSb.

The data segment DSc after run length constraint coding is referred to as a data segment DSd. In run length constraint coding, a size of a data segment may be increased. Therefore, the size of the data segment DSd is equal to or larger than the size of the data segment DSc.

The data segment DSd after LDPC coding is referred to as a data segment DSe. According to the LDPC coding, the size of the data segment increases by the generated LDPC code. Therefore, the size of the data segment DSe is larger than that of the data segment DSd.

The data segment DSe generated by the RWC 25 is written in one sector. Therefore, the size of the data segment DSe is equal to or less than the sector size.

Hereinafter, the data segment DSa, the data segment DSb, the data segment DSc, the data segment DSd, and the data segment DSe may be collectively referred to as a data segment DS.

Figure 4:
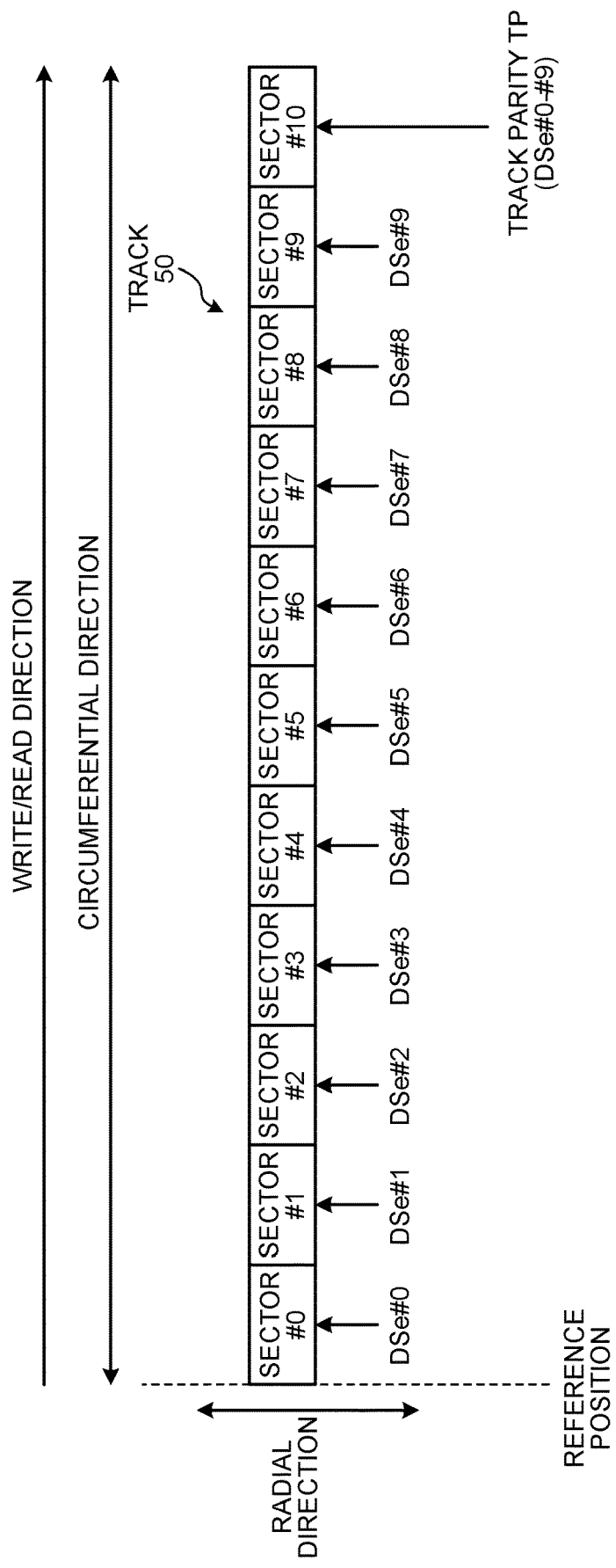
FIG. 4 is a schematic diagram illustrating an example of a configuration of one track of according to the embodiment.

FIG. 4 is a schematic diagram illustrating an example of a configuration of one track 50 of according to the embodiment. In the drawing, illustration of the servo region 41 is omitted. In addition, a write/read direction is illustrated in the drawing. The write/read direction is a direction in which the magnetic head 22 moves relative to the track 50 by the rotation of the magnetic disk 11. The magnetic head 22 writes or reads data in the write/read direction with respect to each track 50.

Each sector provided in the track 50 is identified by a sector number. A sector having sector number x is referred to as a sector #x. In the example illustrated in FIG. 4, the track 50 includes 11 sectors from the sector #0 to the sector #10. The data segment DSe written to the sector #x is referred to as a data segment DSe #x.

Hereinafter, when not only the data segment DSe but also the data segment DSa, the data segment DSb, the data segment DSc, or the data segment DSd are written, the sector number of the sector to be finally written may be added to the end.

The data segment DSe written in each sector includes the LDPC code generated by the processing of S104 in FIG. 3. Therefore, error correction in units of sectors using the LDPC code can be performed on the data segment DSe read from one sector.

When the sector #0 is set as a head in the write/read direction, the sector #10 can be considered as a tail sector. The tail sector #10 is a sector for storing the parity. That is, the writing in units of tracks is executed, for example, as follows. First, the data segments DSe #0 to DSe #9 are written in the order of sector numbers in the sectors #0 to #9. In the sector #10, the parity calculated based on the group of the data segments DSe written in the sectors #0 to #9 is written. This parity is referred to as a track parity TP.

The track parity TP is generated by calculating exclusive OR (in other words, XOR) for each bit position with respect to the data segments DSe #0 to DSe #9. The controller 30 can protect the data DSe #0 to #9 written in the sectors #0 to #9 using the track parity TP from the occurrence of an error. That is, the track parity TP protects data in units of tracks.

For example, even if an error that cannot be corrected even by error correction in units of sectors is included in the data segment DS stored in a certain sector (referred to as a target sector) among the sectors #0 to #9, it is possible to obtain the data segment DS having no error stored in the target sector by calculation using the data segments DS stored in all the other sectors of the target sector among the sectors #0 to #9 and the track parity TP.

Hereinafter, the error correction using the track parity TP is referred to as error correction in units of tracks. The calculation of the exclusive OR means the calculation of the exclusive OR for each bit position. A sector (for example, the sectors #0 to #9 in FIG. 4) in which the data segment DSe is written is referred to as a data sector. A sector (for example, the sector #10 in FIG. 4) in which the track parity TP is written is referred to as a parity sector. The data sector is an example of the first sector. The parity sector is an example of the second sector.

A state where the data segment DSe written to the track 50 is protected by the track parity TP is referred to as a state where the track protection function is valid. In addition, a state where the data segment written to the track 50 is not protected by the track parity TP is referred to as a state where the track protection function is invalid.

For example, in a case where the data segment DSe is written in all the data sectors of a certain track 50 and the track parity TP calculated based on the group of the data segments DSe written in all the data sectors is written in the parity sector of the track 50, the group of the data segments DSe written in the track 50 corresponds to the track parity TP. Therefore, the group of data segments DSe written in the track 50 is in a state of being protected by the track parity TP. That is, the track protection function is valid in the track 50.

When the random writing is executed on the track 50 in which the track protection function is valid, that is, the overwriting of the data segment DSe with respect to some data sectors is executed, the group of the data segments DSe in the track 50 does not correspond to the track parity TP that has already been written, and is in a state of not being protected by the track parity TP. That is, the track protection function is invalid in the track 50.

In the track 50 in which the track protection function is invalid, when the new track parity TP is recalculated and the new track parity TP is overwritten to the parity sector, the group of the data segments DSe in the track 50 is protected by the new track parity TP. That is, the track protection function becomes valid for the track 50.

Whether the track protection function is valid or invalid affects various controls. As an example of control that affects whether the track protection function is valid or invalid, there is control related to adjacent track interference (ATI).

ATI is an influence on an adjacent track when writing to a magnetic disk is performed. For example, when data is written to one track 50 (referred to as a first track 50), the track 50 (second track 50) adjacent to the first track 50 is affected by ATI. The influence of the ATI received by the second track 50 is accumulated according to the number of writings with respect to the first track 50. When the influence of the ATI received by the second track 50 becomes too large, it becomes difficult to read the data stored in the second track 50.

The controller 30 executes a rewrite operation of rewriting all the data segments DSe in units of tracks before each track 50 becomes difficult to read data due to the influence of ATI. Specifically, the controller 30 estimates the degree of influence of the ATI received by each track 50 from the number of writings to the adjacent track 50 or the like, and when the estimated degree exceeds a predetermined threshold value, executes the rewrite operation with respect to the track 50 in which the estimated value of the degree of influence of the ATI exceeds the threshold value. A threshold value to be compared with the estimated value of the degree of influence of ATI in order to determine whether or not to execute the rewrite operation is referred to as an ATI threshold value.

The track 50 in which the track protection function is invalid is vulnerable to the influence of ATI as compared with the track 50 in which the track protection function is valid. Therefore, in a case where the track protection function is invalid, the controller 30 uses a value smaller than the ATI threshold value used when the track protection function is valid as the ATI threshold value. This prevents difficulty in reading the data segment DSe from the track 50 having an invalid track protection function.

As another example of control that affects whether the track protection function is valid or invalid, there is control for executing error correction in units of tracks in the read operation. In a case where the error correction in units of sectors with respect to the data segment to be read is not successful at the time of the read operation, if the track protection function is valid, the controller 30 executes the error correction in units of tracks. When the track protection function is invalid, it is clear that the error cannot be corrected by the error correction in units of tracks, and thus, in order to save the response time, the controller 30 refrains from executing the error correction in units of tracks.

In order to increase the effect expected for the control based on whether the track protection function is valid or invalid as described above, it is assumed that the correct track parity TP is generated at the time of writing or rewriting the data segment DSe in units of tracks. In a case where an incorrect track parity TP is generated due to a failure in the circuit that generates the track parity TP or a failure in generation of the track parity TP due to an error in some processing, the group of the data segments DSe written in the track 50 does not correspond to the track parity TP, and thus the error correction using the track parity TP does not normally function.

That is, a mechanism capable of confirming that the correct track parity TP is generated is required.

Therefore, in the embodiment, the controller 30 is configured to include a hardware circuit capable of detecting an incorrectness of the track parity TP at the time of generating the track parity TP. Hereinafter, a configuration of a hardware circuit for detecting incorrectness of the track parity TP will be described.

Figure 5:
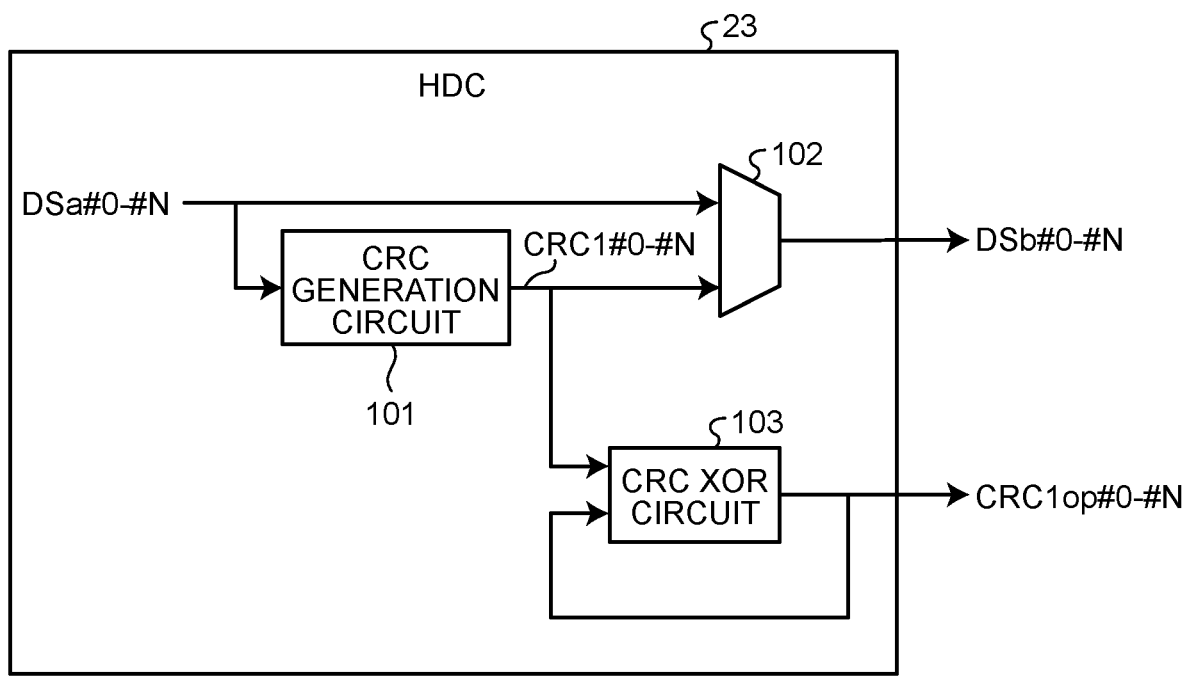
FIG. 5 is a schematic diagram illustrating an example of a hardware configuration of an HDC according to the embodiment.

FIG. 5 is a schematic diagram illustrating an example of a hardware configuration of the HDC 23 according to the embodiment.

Figure 6:
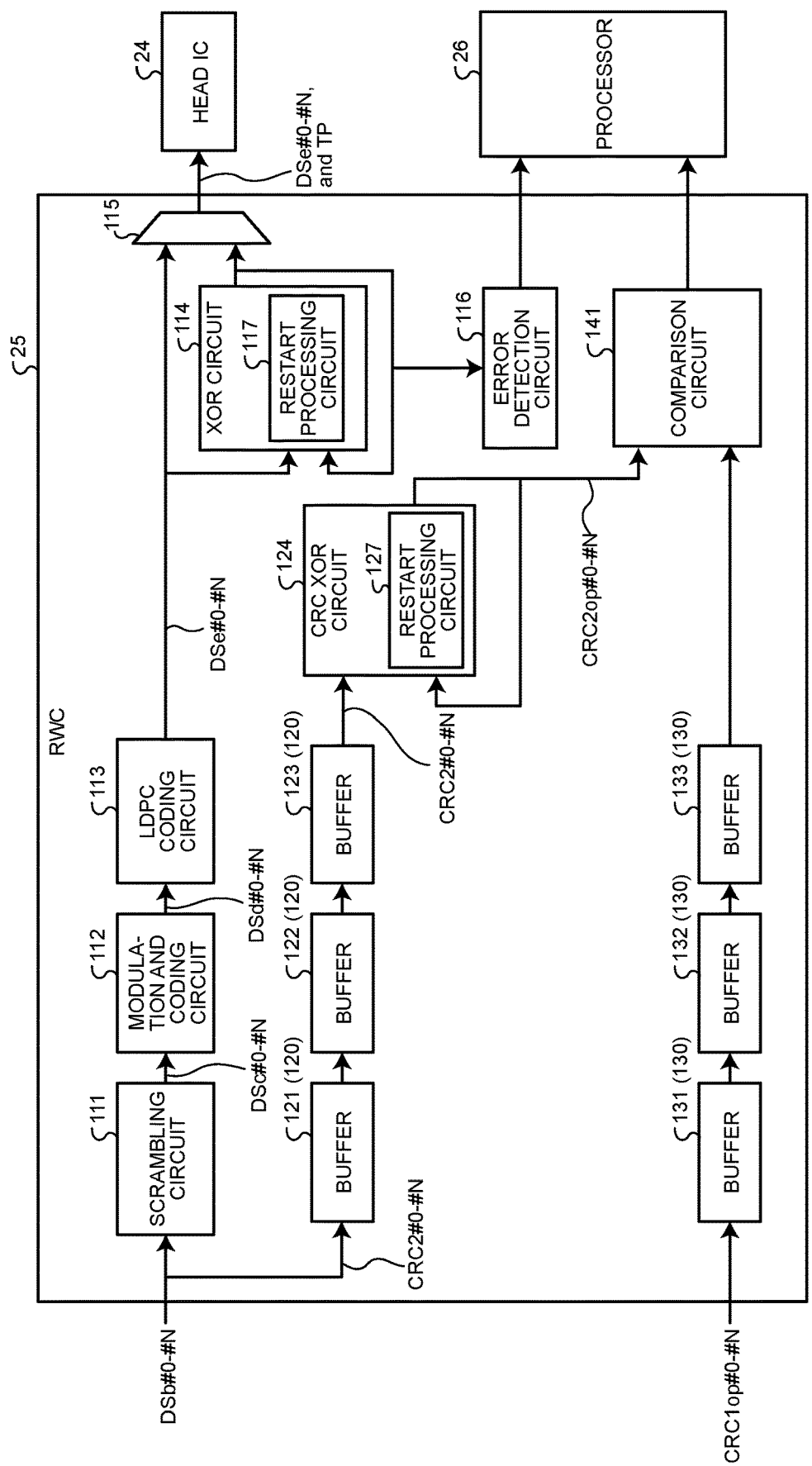
FIG. 6 is a diagram illustrating an example of a hardware configuration of an RWC according to the embodiment.
Figure 7:
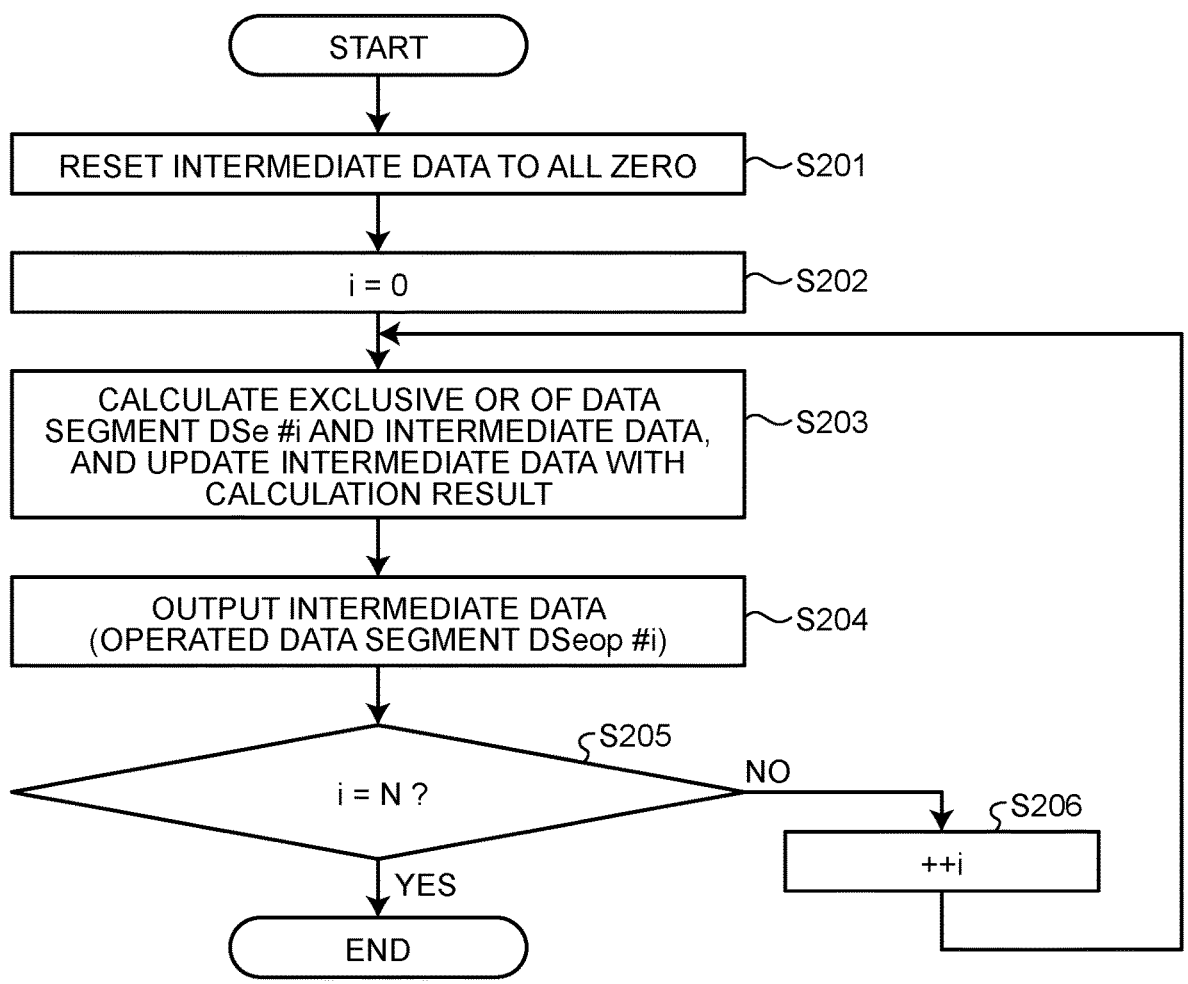
FIG. 7 is a flowchart illustrating an example of an operation (first XOR operation) of calculating exclusive OR by a XOR circuit according to the embodiment.

Note that, in FIGS. 5 to 7, the information generated based on the data segment DS is referred to as the same number as the sector number of the data sector of the write destination of the data segment DS. In addition, in FIGS. 5 to 7, it is assumed that N+1 data sectors #0 to #N (where N is an integer of 1 or more) and parity sectors are provided as the plurality of sectors in one track 50.

The HDC 23 includes a CRC generation circuit 101, a selector 102 having two input terminals, and a CRC XOR circuit 103.

When data segments DSa #0 to #N are written, the HDC 23 executes the processing of S101 illustrated in FIG. 3 on each of the data segments DSa #0 to #N in the order of sector numbers.

Specifically, the data segments DSa #0 to #N are input to one of the two input terminals of the selector 102 and the CRC generation circuit 101 in the order of sector numbers. The CRC generation circuit 101 calculates the first code CRC1 from each input data segment DSa, and inputs the first code CRC1 generated by the calculation to the other one of the two input terminals of the selector. The first code CRC1 generated from the data segment DSa #x is referred to as a first code CRC1 #x. That is, the CRC generation circuit 101 inputs first codes CRC1 #0 to #N to the selector 102 in the order of the data segments DSa that are the basis of the calculation, that is, in the order of sector numbers.

When the data segment DSa #x and the first code CRC1 #x are input, the selector 102 outputs the data segment DSa #x based on the selection signal, and outputs the first code CRC1 #x following the output of the data segment DSa #x. The selector 102 executes the output of the data segment DSa #x and the output of the first code CRC1 #x subsequent to the output of the data segment DSa #x for each of the data segments DSa #0 to #N. As a result, the data segments DSa #0 to #N to which the corresponding first codes CRC1 are added, that is, data segments DSb #0 to #N are output from the selector 102.

The first codes CRC1 #0 to #N generated by the CRC generation circuit 101 is also input to the CRC XOR circuit 103. Every time the first code CRC1 is input, the CRC XOR circuit 103 calculates exclusive OR with respect to all the first codes CRC1 input so far among the CRC #0 to #N. Then, the CRC XOR circuit 103 sequentially outputs the values generated by the calculation.

Specifically, the CRC XOR circuit 103 includes a register (not illustrated) capable of holding intermediate data. The first codes CRC1 #0 to #N are input to the CRC XOR circuit 103 in the order of sector numbers. Before the first code CRC1 #0 is input to the CRC XOR circuit 103, the register of the CRC XOR circuit 103 is reset, and the intermediate data is all zero. Every time one first code CRC1 of the first codes CRC1 #0 to #N is newly input, the CRC XOR circuit 103 calculates exclusive OR of the intermediate data in the register and the newly input first code CRC1, and stores a value obtained by the calculation as the intermediate data in the register in an overwriting manner.

Every time the first code CRC1 is input, the CRC XOR circuit 103 advances the calculation of the exclusive OR and the update of the intermediate data, and outputs the updated intermediate data. Information output from the CRC XOR circuit 103 in response to the input of the first code CRC1 #x, that is, a value obtained by exclusive OR with respect to the first codes CRC1 #0 to #x is referred to as an operated first code CRC1op #x.

Note that the operated first code CRC1op #N among the operated first codes CRC1op #0 to #N is an example of the first information.

The HDC 23 synchronously inputs the data segments DSb #0 to #N and the operated first codes CRC1op #0 to #N to the RWC 25.

The RWC 25 generates the data segments DSe #0 to #N and the track parity TP from the data segments DSb #0 to #N, and checks whether or not the correct track parity TP is generated based on the operated first code CRC1op #N or the like.

FIG. 6 is a diagram illustrating an example of a hardware configuration of the RWC 25 according to the embodiment.

The RWC 25 includes a scrambling circuit 111, a modulation and coding circuit 112, an LDPC coding circuit 113, an XOR circuit 114, a selector 115, an error detection circuit 116, a plurality of buffers 120, a CRC XOR circuit 124, a plurality of buffers 130, and a comparison circuit 141. The XOR circuit 114 includes a restart processing circuit 117. The CRC XOR circuit 124 includes a restart processing circuit 127.

The scrambling circuit 111 scrambles the data segment DSb and outputs the scrambled data segment DSb, that is, the data segment DSc.

The modulation and coding circuit 112 performs run length constraint coding on the data segment DSc output from the scrambling circuit 111 under a condition where MTR is constrained, and outputs the data segment DSc after the run length constraint coding, that is, the data segment DSd.

The LDPC coding circuit 113 performs LDPC coding on the data segment DSd output from the modulation and coding circuit 112, and outputs the data segment DSd after LDPC coding, that is, the data segment DSe.

The data segments DSb #0 to #N output from the HDC 23 are sequentially input to the scrambling circuit 111. Therefore, the scrambling circuit 111 sequentially scrambles each of the data segments DSb #0 to #N to generate data segments DSc #0 to #N, and sequentially outputs the generated data segments DSc #0 to #N. Therefore, the modulation and coding circuit 112 sequentially performs run length constraint coding on each of the data segments DSc #0 to #N to generate data segments DSd #0 to #N, and sequentially outputs the generated data segments DSd #0 to #N. Therefore, the LDPC coding circuit 113 sequentially performs LDPC coding on each of the data segments DSd #0 to #N to generate the data segments DSe #0 to #N, and sequentially outputs the generated data segments DSe #0 to #N.

The XOR circuit 114 generates the track parity TP by calculating the exclusive OR of the data segments DSe #0 to #N.

More specifically, the data segments DSe #0 to #N are input to the XOR circuit 114 in the order of sector numbers. In addition, the XOR circuit 114 includes a register (not illustrated) capable of holding intermediate data. Before the data segment DSe #0 is input to the XOR circuit 114, the contents of the register of the XOR circuit 114, that is, the intermediate data are all reset to zero. Every time one data segment DSe of the data segments DSe #0 to #N is newly input, the XOR circuit 114 calculates exclusive OR of the intermediate data and the newly input data segment DSe, and stores data segment obtained by the calculation as the intermediate data in the register in an overwriting manner.

As described above, the XOR circuit 114 advances the calculation of the exclusive OR and the update of the intermediate data every time the data segment DSe is input. Therefore, when a certain data segment DSe #x of the data segments DSe #0 to #N is input to the XOR circuit 114, the register of the XOR circuit 114 is in a state where the data segment obtained by the exclusive OR with respect to the data segments DSe #0 to #x is stored by the calculation of the exclusive OR according to the input of the data segment DSe #x and the update of the intermediate data. Therefore, when the calculation of the exclusive OR according to the input of the data segment DSe #N and the update of the intermediate data are completed, the register of the XOR circuit 114 is in a state where the data segment obtained by the exclusive OR with respect to the data segments DSe #0 to #N, that is, the track parity TP, is stored as the intermediate data.

Note that, every time one data segment DSe #x is input, the XOR circuit 114 outputs the updated intermediate data, that is, the data segment obtained by exclusive OR with respect to the data segments DSe #0 to #x. A data segment obtained by exclusive OR with respect to the data segments DSe #0 to #x output from the XOR circuit 114 is referred to as an operated data segment DSeop #x. Note that the operated data segment DSeop #N corresponds to the track parity TP.

The selector 115 includes two input terminals. The data segments DSe #0 to #N are input to one of the two input terminals, and the operated data segments DSeop #0 to #N are input to the other of the two input terminals.

When the data segments DSe #0 to #N are input, the selector 115 outputs the data segments DSe #0 to #N to the head IC 24 based on the selection signal. After that, when the operated data segment DSeop #N is input, the selector 115 outputs the input operated data segment DSeop #N, that is, the track parity TP to the head IC 24 based on the selection signal.

The data segments DSe #0 to #N and the track parity TP generated from the data segments DSe #0 to #N are input from the selector 115 to the head IC 24. The head IC 24 sequentially supplies the data segments DSe #0 to #N and the track parity TP to the magnetic head 22. The magnetic head 22 executes writing of the data segments DSe #0 to #N into the data sectors #0 to #N and writing of the track parity TP into the parity sector under the positioning control.

The scrambling circuit 111, the modulation and coding circuit 112, and the LDPC coding circuit 113 constitute a pipeline. Hereinafter, in the present specification, a pipeline including the scrambling circuit 111, the modulation and coding circuit 112, and the LDPC coding circuit 113 is simply referred to as a pipeline.

The number of buffers 120 included in the RWC 25 corresponds to the number of pipeline stages included in the pipeline. The number of pipeline stages included in the pipeline is three here by way of example. Therefore, the RWC 25 includes three buffers 121 to 123 as the plurality of buffers 120. The three buffers 121 to 123 are connected in series.

When the data segment DSb #x is input to the scrambling circuit 111, the first code CRC1 #x included in the data segment DSb #x is acquired from the data segment DSb #x, and the acquired data segment DSb #x is input to the buffer 121. The first code CRC1 #x acquired from the data segment DSb #x is referred to as a second code CRC2 #x.

The second code CRC2 #x input to the buffer 121 is transferred from the buffer 121 to the buffer 123 in synchronization with the transfer of the data segment DS between the circuits in the pipeline, and then input to the CRC XOR circuit 124. Therefore, the second codes CRC2 #0 to #N is input to the CRC XOR circuit 124 in synchronization with the input of the data segments DSe #0 to #N to the XOR circuit 114.

The CRC XOR circuit 124 has a circuit configuration similar to that of the XOR circuit 114 except that the data to be subjected to the exclusive OR is not the data segments DSe #0 to #N but the second codes CRC2 #0 to #N.

Specifically, the CRC XOR circuit 124 includes a register (not illustrated) capable of holding intermediate data. Before the second code CRC2 #0 is input to the CRC XOR circuit 124, the contents of the register of the CRC XOR circuit 124, that is, the intermediate data are all reset to zero. Every time one second codes CRC2 of the second codes CRC2 #0 to #N is newly input, the CRC XOR circuit 124 calculates exclusive OR of the intermediate data and the newly input second codes CRC2, and stores a data segment obtained by the calculation as the intermediate data in the register in an overwriting manner.

As described above, the CRC XOR circuit 124 advances the calculation of the exclusive OR and the update of the intermediate data every time the second code CRC2 is input. Therefore, when a certain second code CRC2 #x of the second codes CRC2 #0 to #N is input to the CRC XOR circuit 124, the value obtained by the exclusive OR with respect to the second codes CRC2 #0 to #x is stored in the register of the CRC XOR circuit 124 by the calculation of the exclusive OR and the update of the intermediate data. A value obtained by exclusive OR with respect to the second codes CRC2 #0 to #x stored in the register is referred to as an operated second code CRC2op #x.

The CRC XOR circuit 124 outputs the intermediate data in the register every time the second code CRC2 is input. That is, the CRC XOR circuit 124 sequentially outputs the operated second codes CRC2op #0 to #N.

Note that the operated second code CRC2op #N among the operated second codes CRC2op #0 to #N is an example of the second information.

The comparison circuit 141 includes two input terminals. The operated second codes CRC2op #0 to #N are sequentially input to one of the two input terminals. In addition to the two input terminals, the operated first codes CRC1op #0 to #N are sequentially input via the plurality of buffers 130 connected in series.

The number of buffers 130 included in the RWC 25 corresponds to the number of pipeline stages included in the pipeline. Therefore, here, the RWC 25 includes three buffers 131 to 133 as the plurality of buffers 130. The three buffers 131 to 133 are connected in series.

In synchronization with the input of the data segment DSb #x to the scrambling circuit 111 (and the input of the second code CRC2 #x to the buffer 121), the operated first code CRC1op #x is input to the buffer 131. The operated first code CRC1op #x input to the buffer 131 is transferred from the buffer 131 to the buffer 133 in synchronization with the transfer of the data segment DS between the circuits in the pipeline, and then input to the comparison circuit 141. Therefore, the operated first codes CRC1op #0 to #N are input to the comparison circuit 141 in synchronization with the inputs of the operated second codes CRC2op #0 to #N.

The comparison circuit 141 compares the operated second code CRC2op #N with the operated first code CRC1op #N, and transmits a comparison result to the processor 26.

In a case where the CRC XOR circuit 124 has correctly executed the calculation of the exclusive OR, the operated second code CRC2op #N output from the CRC XOR circuit 124 should match the operated first code CRC1op #N. When an error occurs in the processing in the CRC XOR circuit 124, an incorrect value is output as the operated first code CRC1op #N, and the output operated second code CRC2op #N does not match the operated first code CRC1op #N.

In addition, as described above, the CRC XOR circuit 124 has a circuit configuration similar to that of the XOR circuit 114 except that data to be subjected to exclusive OR is different. Then, the CRC XOR circuit 124 executes the calculation of the exclusive OR with respect to the second codes CRC2 #0 to #N in synchronization with the calculation of the exclusive OR with respect to the data segments DSe #0 to #N executed by the XOR circuit 114. Therefore, in a case where the CRC XOR circuit 124 outputs an incorrect value as the operated second code CRC2op #N, it can be inferred that an error has occurred in the processing in the XOR circuit 114.

For example, in a case where there is a failure in the design of the XOR circuit 114 (and the CRC XOR circuit 124), an incorrect value may be output as the track parity TP. The manufacturer can detect a failure in the design of the XOR circuit 114 (and the CRC XOR circuit 124) by the above mechanism. Specifically, the manufacturer causes the magnetic disk device 1 to execute the write operation in units of tracks in the manufacturing process, and acquires the comparison result by the comparison circuit 141. In a case where the comparison results in inconsistency, the manufacturer can infer that there is a failure in the design of the XOR circuit 114 (and the CRC XOR circuit 124).

In addition, examples of a case where an error is likely to occur during the operation of the magnetic disk device 1 include failure of the restart processing in the XOR circuit 114 (and the CRC XOR circuit 124). The restart processing will be described below.

In the magnetic disk device 1, the write operation may be interrupted during the write operation. For example, an off-track may occur in which the position of the magnetic head 22 drifts from the target track 50 beyond an allowable range in the radial direction while a write operation is being performed on the target track 50. In a case where the off-track is detected, the controller 30 immediately interrupts the write operation. Then, when it is confirmed that the off-track has been resolved, the controller 30 restarts the write operation from the sector in which the write operation has been interrupted.

In addition, the controller 30 interrupts the write operation in a case where vibration at a level exceeding an allowable level is detected during the write operation. Then, the controller 30 restarts the write operation when the level of vibration becomes less than the allowable level.

In a case where the controller 30 interrupts the write operation in units of tracks, the XOR circuit 114 (and the CRC XOR circuit 124) interrupts the calculation of the exclusive OR advanced with respect to the series of data (the data segment DSe or the second code CRC2) input for each sector number. Then, when the controller 30 restarts the write operation in units of tracks, the XOR circuit 114 (and the CRC XOR circuit 124) resumes the calculation of the exclusive OR.

The XOR circuit 114 (and the CRC XOR circuit 124) restarts the calculation of the exclusive OR from the data input after the data for which the calculation of the exclusive OR has been performed last immediately before the interruption among the series of data (the data segment DSe or the second code CRC2). Therefore, the XOR circuit 114 (and the CRC XOR circuit 124) needs to determine which data is input to restart the calculation of the exclusive OR, that is, the timing of the calculation of the exclusive OR.

In the present specification, the restart processing is processing of determining the timing of calculation of exclusive OR. In the XOR circuit 114, the restart processing circuit 117 executes the restart processing. In the CRC XOR circuit 124, the restart processing circuit 127 executes the restart processing.

In a case where the calculation timing of the exclusive OR determined in the XOR circuit 114 (more precisely, the restart processing circuit 117) is not appropriate, the obtained track parity TP is incorrect. In this case, also in the CRC XOR circuit 124 having a circuit configuration similar to that of the XOR circuit 114, the calculation of the exclusive OR based on the inappropriate timing is restarted, and the operated second code CRC2op #N calculated immediately after the restart processing becomes an incorrect value. As a result, a determination result indicating inconsistency is output from the comparison circuit 141.

The processor 26 determines whether or not the track parity TP with an incorrect value is output based on the comparison result output by the comparison circuit 141.

Furthermore, in the embodiment, the RWC 25 includes a mechanism capable of detecting incorrectness of the track parity TP caused by an error in the LDPC coding circuit 113.

Specifically, the operated data segments DSeop #0 to #N output from the XOR circuit 114 are input to the error detection circuit 116. When the operated data segment DSeop #N of the operated data segments DSeop #0 to #N, that is, the trap parity TP is input, the error detection circuit 116 executes hard determination on the operated data segment DSeop #N as error correction corresponding to the LDPC code and attempts to detect an error. The error detection circuit 116 transmits a detection result to the processor 26.

Since all the data segments DSe #0 to #N are LDPC-encoded, it is possible to execute error correction corresponding to the LDPC code also on the operated data segment DSeop #N generated from the data segments DSe #0 to #N. Then, since the operated data segment DSeop #N is generated based on the data segments DSe #0 to #N for which little time has passed since the LDPC coding was performed by the LDPC coding circuit 113, an error should not be detected by the error correction with respect to the operated data segment DSeop #N in the error detection circuit 116 as long as the LDPC coding circuit 113 can correctly execute the LDPC coding. Conversely, in a case where an error is detected in the error detection circuit 116, it can be inferred that the LDPC coding circuit 113 has not correctly executed the LDPC encoding. In a case where the LDPC coding circuit 113 cannot correctly execute the LDPC coding, a correct track parity TP cannot be obtained.

Therefore, in a case where the result of the error detection by the error detection circuit 116 indicates the occurrence of the error, the processor 26 determines that the incorrect track parity TP is output. With this mechanism, it is possible to detect incorrectness of the track parity TP caused by an error in the processing in the LDPC coding circuit 113.

Next, the operation of each component of the magnetic disk device 1 of the embodiment at the time of the write operation in units of tracks will be described.

First, the operation in the RWC 25 when the input of the data segments DSb #0 to #N and the input of the operated first codes CRC1op #0 to #N synchronized with the input of the data segments DSb #0 to #N are performed from the HDC 23 to the RWC 25 will be described with reference to FIGS. 7 to 9.

FIG. 7 is a flowchart illustrating an example of an operation (referred to as first XOR operation) of calculating exclusive OR by the XOR circuit 114 according to the embodiment.

First, the XOR circuit 114 resets the contents of the register of the XOR circuit 114, that is, the intermediate data to all zero (S201), and initializes an index i of the loop processing to zero (S202).

After that, the XOR circuit 114 executes the loop processing of steps S203 to S206 for each of the data segments DSe #0 to #N input from the LDPC coding circuit 113. Steps in the loop processing of steps S203 to S206 will be described in order of execution.

In step S203, the XOR circuit 114 calculates the exclusive OR of a data segment DSe #i and the intermediate data in the register, and updates the intermediate data in the register with the calculation result.

In step S204, the XOR circuit 114 outputs the updated intermediate data, that is, an operated data segment DSeop #i.

In step S205, the XOR circuit 114 determines whether or not i is equal to N. In a case where i is not equal to N (S205: No), the control proceeds to step S206. In a case where i is equal to N (S205: Yes), the first XOR operation by the XOR circuit 114 ends. Note that the operated data segment DSeop #N output by the XOR circuit 114 in step S203 in the last loop processing corresponds to the track parity TP calculated from the data segments DSe #0 to #N.

In step S206, the XOR circuit 114 increments the index i by 1. After step S206, the control proceeds to step S203.

Figure 8:
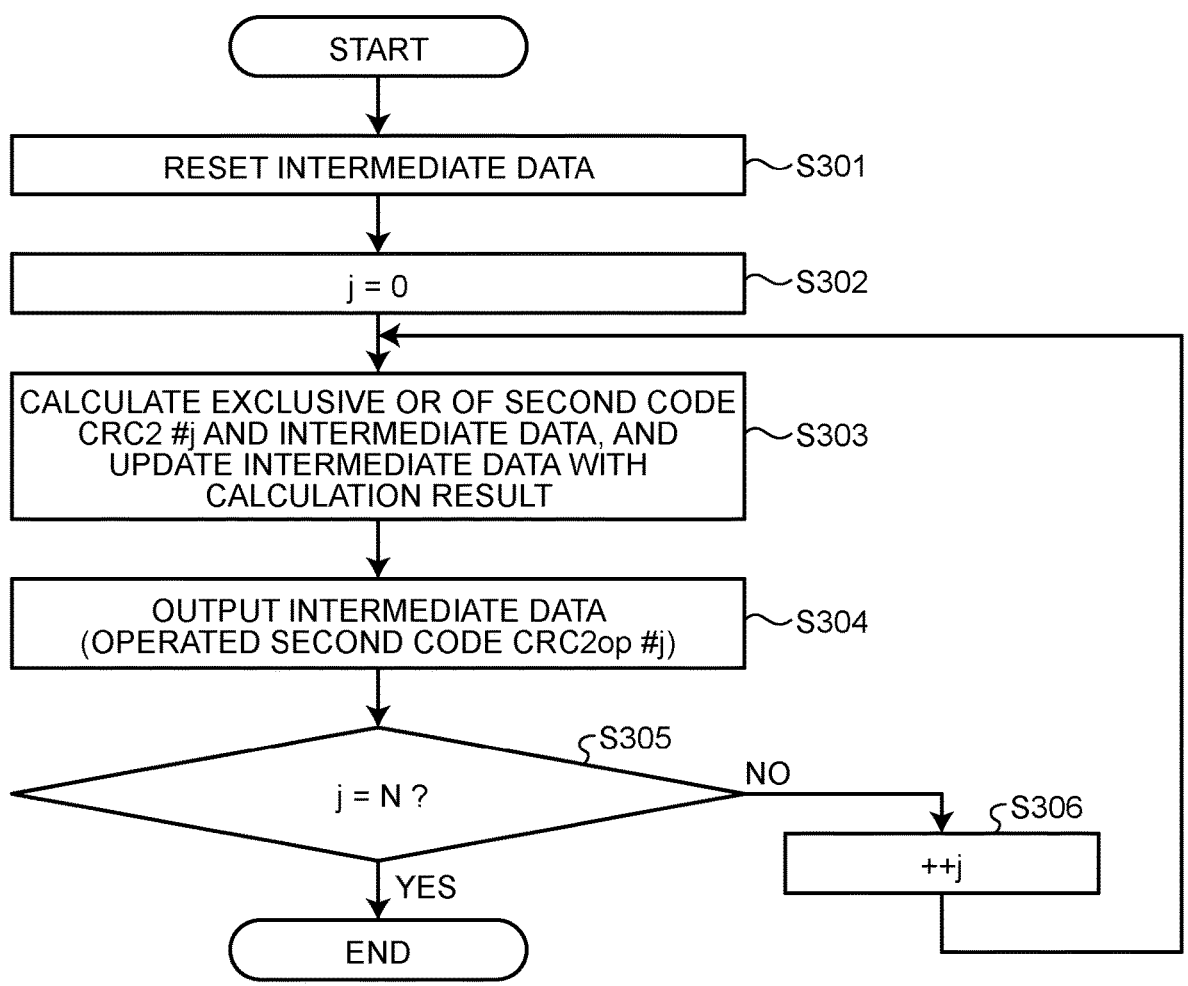
FIG. 8 is a flowchart illustrating an example of an operation (second XOR operation) of calculating exclusive OR by a CRC XOR circuit according to the embodiment.

FIG. 8 is a flowchart illustrating an example of an operation (referred to as second XOR operation) of calculating exclusive OR by the CRC XOR circuit 124 according to the embodiment.

First, the CRC XOR circuit 124 resets the contents of the register of the CRC XOR circuit 124, that is, the intermediate data to all zero (S301), and initializes an index j of the loop processing to zero (S302).

After that, the CRC XOR circuit 124 executes the loop processing of steps S303 to S306 for each of the second codes CRC2 #0 to #N input from the buffer 121. Steps in the loop processing of steps S303 to S306 will be described in order of execution.

In step S303, the CRC XOR circuit 124 calculates the exclusive OR of a second codes CRC2 #j and the intermediate data in the register, and updates the intermediate data in the register with the calculation result.

In step S304, the CRC XOR circuit 124 outputs the updated intermediate data, that is, an operated second code CRC2op #j.

In step S305, the CRC XOR circuit 124 determines whether or not j is equal to N. In a case where j is not equal to N (S305: No), the control proceeds to step S306. In a case where j is equal to N (S305: Yes), the second XOR operation by the CRC XOR circuit 124 ends.

In step S306, the CRC XOR circuit 124 increments the index j by 1. After step S306, the control proceeds to step S303.

Figure 9:
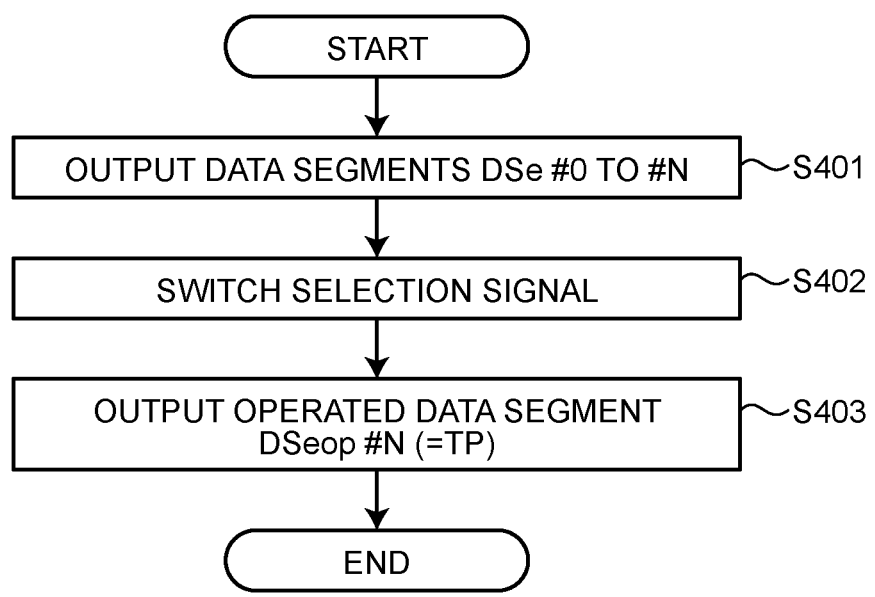
FIG. 9 is a flowchart illustrating an example of an operation of a selector according to the embodiment.

FIG. 9 is a flowchart illustrating an example of an operation of the selector 115 according to the embodiment.

The selector 115 outputs the data segments DSe #0 to #N input from the LDPC coding circuit 113 to the head IC 24 as they are (S401). After that, the selection signal is switched (S402), and thus, the selector 115 outputs the operated data segment DSeop #N input from the XOR circuit 114, that is, the track pitch TP to the head IC 24 (S403). Then, the operation of the selector 115 ends.

Figure 10:
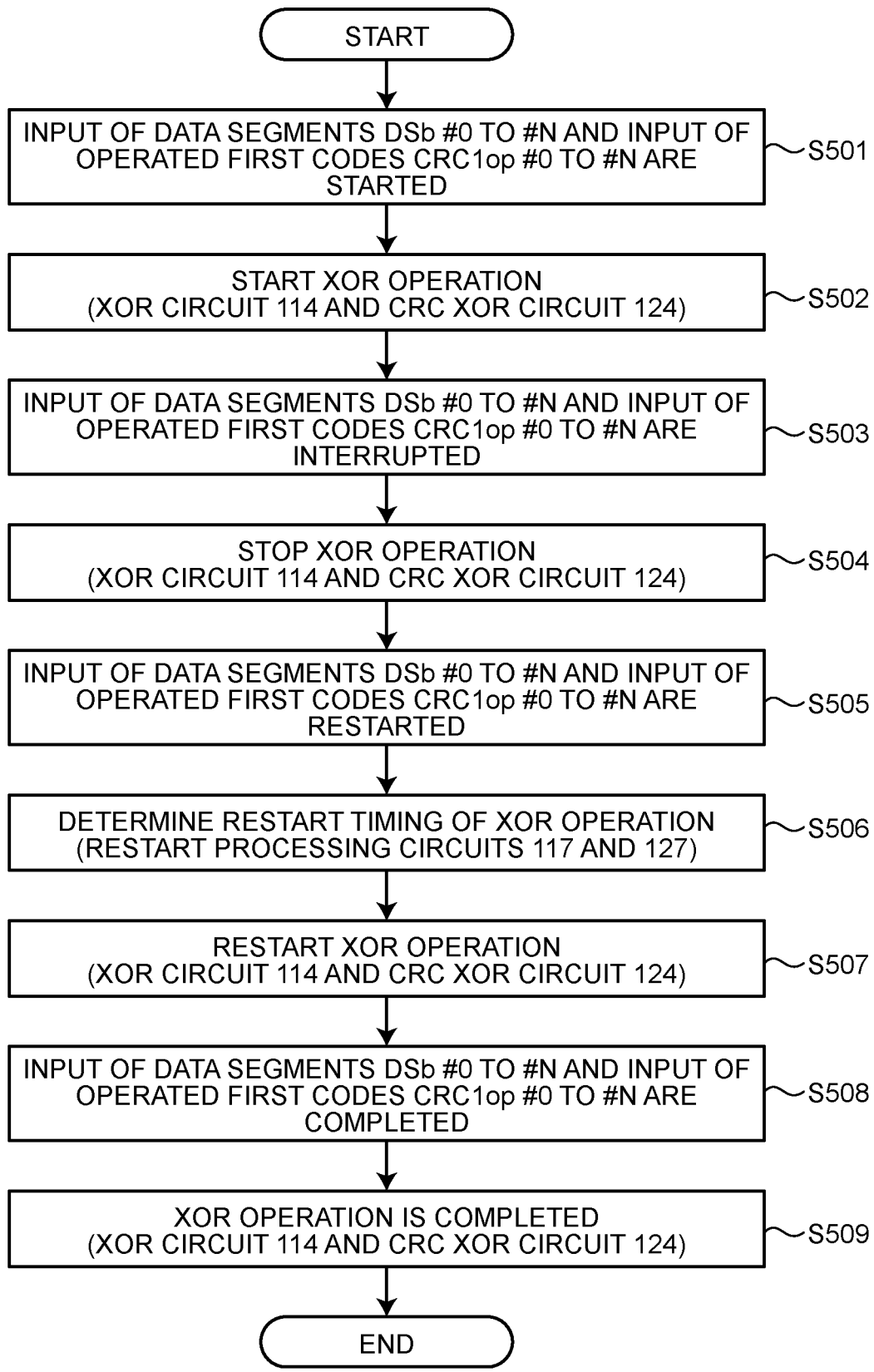
FIG. 10 is a flowchart illustrating an example of an operation of the RWC when a write operation in units of tracks is interrupted and restarted according to the embodiment.

FIG. 10 is a flowchart illustrating an example of an operation of the RWC 25 when a write operation in units of tracks is interrupted and restarted according to the embodiment.

When the input of the data segments DSb #0 to #N and the input of the operated first codes CRC1op #0 to #N synchronized with the input of the data segments DSb #0 to #N start from the HDC 23 to the RWC 25 (S501), the input of the data segments DSe #0 to #N to the XOR circuit 114 and the input of the second codes CRC2 #0 to #N to the CRC XOR circuit 124 start. Then, the XOR circuit 114 and the CRC XOR circuit 124 start an XOR operation with respect to the data input to them (S502).

Subsequently, when the write operation is interrupted and the input of the data segments DSb #0 to #N and the input of the operated first codes CRC1op #0 to #N from the HDC 23 to the RWC 25 are interrupted (S503), the XOR circuit 114 and the CRC XOR circuit 124 stop the XOR operation (S504).

When the cause of the interruption of the write operation is eliminated and the write operation is restarted, and when the input of the data segments DSb #0 to #N and the input of the operated first codes CRC1op #0 to #N from the HDC 23 to the RWC 25 are restarted (S505), the restart processing circuit 117 of the XOR circuit 114 and the restart processing circuit 127 of the CRC XOR circuit 124 determine the restart timing of the XOR operation (S506). When the restart timing arrives, the XOR circuit 114 and the CRC XOR circuit 124 restart the XOR operation (S507).

When the input of the data segments DSb #0 to #N and the input of the operated first codes CRC1op #0 to #N from the HDC 23 to the RWC 25 are completed (S508), the XOR operation in the XOR circuit 114 and the CRC XOR circuit 124 is completed (S509). Then, the operation example ends.

Figure 11:
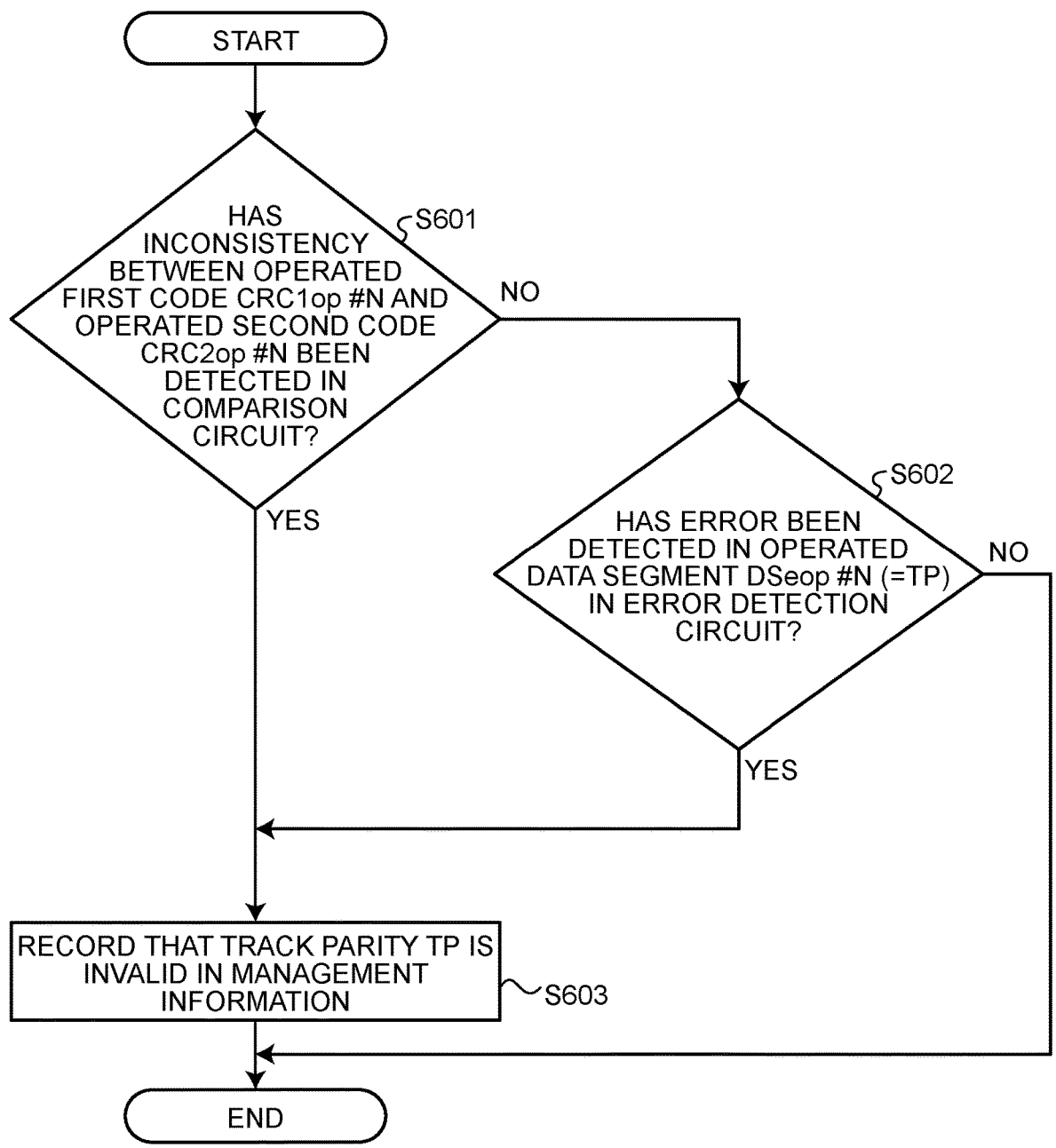
FIG. 11 is a flowchart illustrating an example of an operation of a processor according to the embodiment.

FIG. 11 is a flowchart illustrating an example of an operation of the processor 26 according to the embodiment. In one example, the series of operations illustrated in the drawing is executed at an arbitrary timing after the track parity TP is calculated at the time of the write operation in units of tracks.

The processor 26 determines whether or not inconsistency between the operated first code CRC1op #N and the operated second code CRC2op #N is detected in the comparison circuit 141 based on the comparison result received from the comparison circuit 141 (S601).

In a case where the inconsistency between the operated first code CRC1op #N and the operated second code CRC2op #N is not detected (S601: No), the processor 26 determines whether or not the error is detected in the operated data segment DSeop #N (that is, the track parity TP) in the error detection circuit 116 based on the check result received from the error detection circuit 116 (S602).

In a case where inconsistency between the operated first code CRC1op #N and the operated second code CRC2op #N is detected in the comparison circuit 141 (S601: Yes), or in a case where the error is detected in the operated data segment DSeop #N in the error detection circuit 116 (S602: Yes), the processor 26 records the fact that the track parity TP written to the write destination track 50 is invalid in the management information stored in the predetermined position (for example, the RAM 27) (S603), and ends the operation.

In a case where no error is detected in the operated data segment DSeop #N in the error detection circuit 116 (S602: No), the processor 26 skips the processing of step S603 and ends the operation.

Note that, in the example illustrated in FIG. 11, determination as to whether inconsistency is detected in the comparison circuit 141 and determination as to whether or not an error is detected in the error detection circuit 116 are executed in this order. The order of execution of the two determinations may be reversed.

The processor 26 makes the control with respect to the track 50 on which the write operation in units of tracks is executed different depending on whether or not the track parity TP of the track 50 is recorded in the management information as invalid.

For example, even if random writing has never been performed on a certain track 50 after a write operation in units of tracks is executed on the track 50, in a case where the management information records that the track parity TP of the track 50 is invalid, the processor 26 considers that the track protection function related to the track 50 is invalid. Specifically, the processor 26 makes the ATI threshold value smaller than that when the track protection function is valid, or refrains from executing the error correction in units of tracks in a case where the error correction in units of sectors fails.

In addition, in a case where random writing has never been performed on a certain track 50 after the write operation in units of tracks is executed on the track 50, and the fact that the track parity TP of the track 50 is invalid is not recorded in the management information, the processor 26 regards that the track protection function related to the track 50 is valid. Specifically, the processor 26 uses the ATI threshold value of when the track protection function is valid, or executes the error correction in units of tracks in a case where the error correction in units of sectors fails.

Note that the method for making the control different based on the management information is not limited to this.

As described above, according to the embodiment, the magnetic disk device 1 includes the HDC 23 that is the first circuit block and the RWC 25 that is the second circuit block. The HDC 23 receives the data segments DSa #0 to #N from the host 2. The data segments DSa #0 to #N are the plurality of data segment DSa to be written in the data sectors #0 to #N. The HDC 23 generates and adds the first code CRC1 and outputs the data segment DSb which is the data segment DSa to which the first code CRC1 is added to each of the data segments DSa #0 to #N. In addition, the HDC 23 calculates exclusive OR with respect to first CRC1 #0 to #N which is a group of the first codes CRC1 generated from the data segments DSa #0 to #N, and outputs the operated first code CRC1op #N which is the first information obtained by calculating the exclusive OR with respect to the first codes CRC1 #0 to #N. The RWC 25 receives the data segments DSb #0 to #N which are the plurality of second data segments output from the HDC 23 and the operated first code CRC1op #N output from the HDC 23. Then, the RWC 25 executes the data conversion and the output of the data segment DSe which is the data segment DSb after the data conversion for each of the data segments DSb #0 to #N. In addition, the RWC 25 calculates the exclusive OR with respect to the data segments DSe #0 to #N which are the plurality of third data segments generated by the data conversion with respect to each of the data segments DSb #0 to #N, and outputs the track parity TP which is information obtained by the calculation of the exclusive OR with respect to the data segments DSe #0 to #N following the output of the data segments DSe #0 to #N. In addition, the RWC 25 acquires the first code CRC1 as the second code CRC2 from each of the data segments DSb #0 to #N, and calculates exclusive OR with respect to the second codes CRC2 #0 to #N which are a group of the second codes CRC2 acquired from each of the data segments DSb #0 to #N. Then, the RWC 25 compares the operated first code CRC1*op* #N with the operated second code CRC2*op* #N which is the second information obtained by calculating the exclusive OR with respect to the second codes CRC2 #0 to #N, and outputs a result of comparison between the operated first code CRC1*op* #N and the operated second code CRC2*op* #N. The magnetic head 22 writes the data segments DSe #0 to #N output from the RWC 25 and supplied from the head IC 24 to the data sectors #0 to #N, and writes the track parity TP output from the RWC 25 and supplied from the head IC 24 to the parity sector.

Therefore, the controller 30 can detect the incorrectness of the track parity TP based on the comparison result between the operated first code CRC1*op* #N and the operated second code CRC2*op* #N. More specifically, the controller 30 can detect incorrectness of the track parity TP caused by a failure in the design of the XOR circuit 114 and incorrectness of the track parity TP caused by an error in the processing (for example, restart processing) in the XOR circuit 114.

In addition, according to the embodiment, the RWC 25 includes the XOR circuit 114 and the CRC XOR circuit 124 having a circuit configuration similar to that of the XOR circuit 114. The XOR circuit 114 calculates exclusive OR with respect to the data segments DSe #0 to #N. The second XOR circuit calculates exclusive OR with respect to the second codes CRC2 #0 to #N.

The CRC XOR circuit 124 has a circuit configuration similar to that of the XOR circuit 114 except that data to be subjected to exclusive OR calculation is different. Therefore, by comparing the operated first code CRC1*op* #N with the operated second code CRC2*op* #N output by the CRC XOR circuit 124, it is possible to detect incorrectness of the track parity TP caused by a failure in the design of the XOR circuit 114 or incorrectness of the track parity TP caused by an error in the processing (for example, restart processing) in the XOR circuit 114.

Note that, according to the embodiment, the XOR circuit 114 and the CRC XOR circuit 124 interrupt the calculation of the exclusive OR in a case where the input of the data segments DSb #0 to #N from the HDC 23 to the RWC 25 is interrupted, and after that, execute the restart processing in a case where the input of the data segments DSb #0 to #N from the HDC 23 to the RWC 25 is restarted. In the restart processing, the XOR circuit 114 and the CRC XOR circuit 124 determine the restart timing of the calculation of the exclusive OR. The XOR circuit 114 and the CRC XOR circuit 124 restart the calculation of the exclusive OR at the restart timing obtained by the determination.

In a case where an error occurs in the restart processing, an incorrect value is output as the track parity TP. The controller 30 can detect the track parity TP incorrectness occurring in such a case.

In addition, according to the embodiment, the data conversion in the RWC 25 includes LDPC coding which is error correction coding. The RWC 25 executes error detection (hard determination in the above example) corresponding to the LDPC coding on the track parity TP and outputs a result of the error detection.

Therefore, it is possible to detect incorrectness of the track parity TP caused by an error in the LDPC coding circuit 113.

Modification

In the magnetic disk device 1 of the embodiment, in a case where the incorrectness of the track parity TP is detected, the fact is recorded in the management information, and the contents recorded in the management information is used for the subsequent control. The operation of when the incorrectness of the track parity TP is detected is not limited to this.

A modification of when it is detected that an error occurs in the track parity TP will be described. Note that description of matters similar to those in the embodiment will be omitted here.

Figure 12:
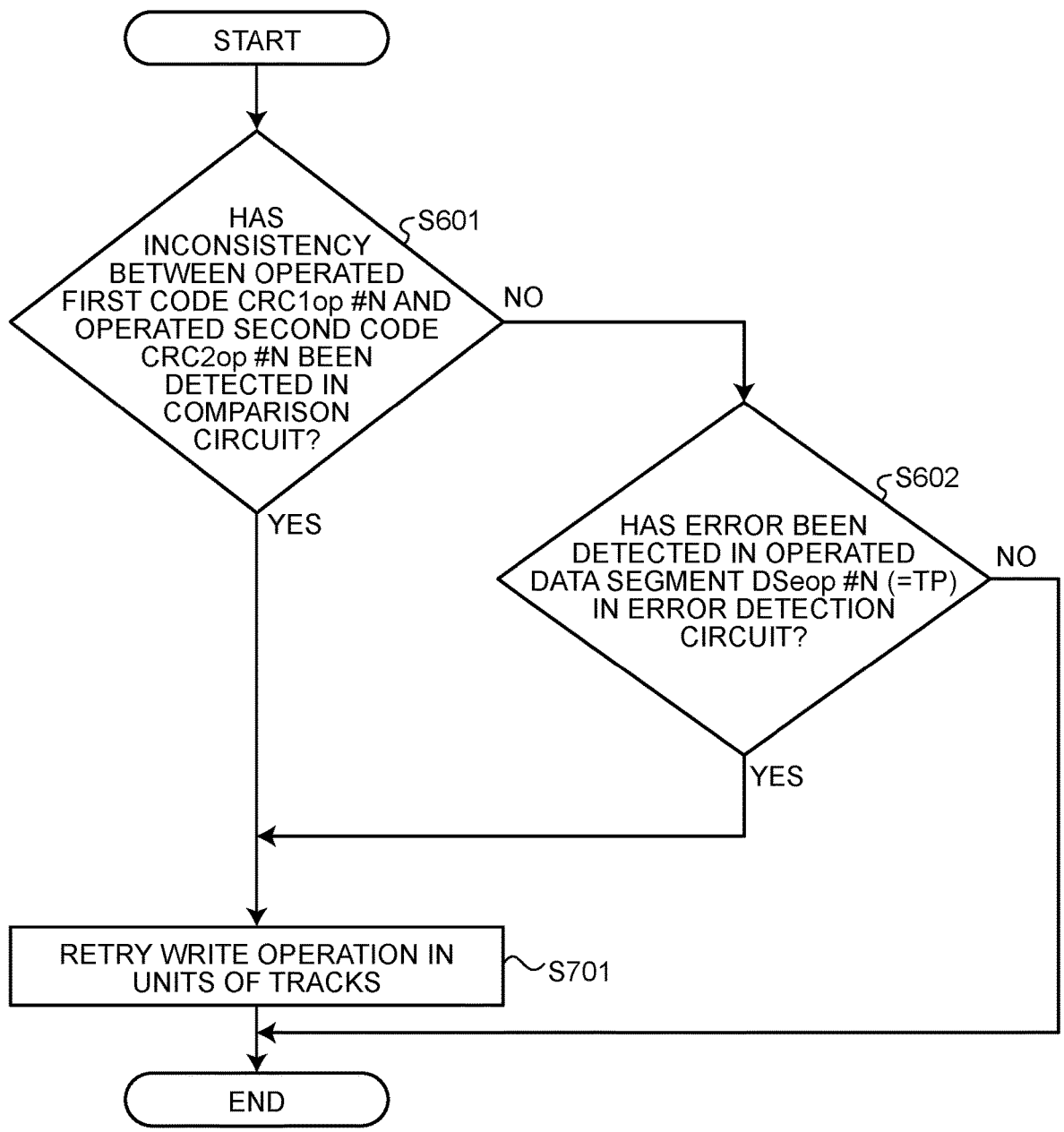
FIG. 12 is a flowchart illustrating an example of an operation of a processor according to a modification of the embodiment.

FIG. 12 is a flowchart illustrating an example of an operation of the processor 26 according to a modification of the embodiment.

Similarly to the embodiment, the processor 26 executes the processing of step S601, and executes the processing of step S602 in a case where No is determined in the processing of step S601.

In a case where inconsistency between the operated first code CRC1*op* and the operated second code CRC2*op* is detected in the comparison circuit 141 (S601: Yes), or in a case where an error is detected in the error detection circuit 116 (S602: Yes), the processor 26 retries the write operation in units of tracks (S701), and ends the operation. At the time of retry of the write operation in units of tracks, the processor 26 re-executes the series of processings in FIG. 12 in a timely manner.

In a case where no error is detected in the error detection circuit 116 (S602: No), the processor 26 skips the processing of step S603 and ends the operation.

As described above, in a case where the incorrectness of the track parity TP is detected, the controller 30 may retry the write operation in units of tracks.

As described above, the operation of when the incorrectness of the track parity TP is detected can be variously changed. The controller 30 can change the control with respect to the track 50 according to the result of the comparison between the operated first code CRC1*op* and the operated second code CRC2*op* and the result of the error detection in the error detection circuit 116.

Note that the error detection circuit 116 may be omitted from the controller 30, and the controller 30 may be configured to change the control with respect to the track 50 according to the result of the comparison between the operated first code CRC1*op* and the operated second code CRC2*op*.

In addition, in the embodiment and the modification, the second code CRC2 #x is acquired from the data segment DSb #x before the data conversion with respect to the data segment DSb #x. The timing of acquiring the second code CRC2 #x is not limited to this.

For example, in the RWC 25, the scrambling (S102) and the run length constraint coding (S103) in the data conversion (S102 to S104) are executed on a portion of the data segment DSb other than the first code CRC1. The LDPC coding (S104) is executed on the entire data segment DS including the first code CRC1. The RWC 25 may acquire the LDPC-encoded first code CRC1 as the second code CRC2 from the data segment DS after the LDPC coding (S104).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device connectable to a host, the magnetic disk device comprising:
    a magnetic disk provided with a track including a plurality of first sectors and a second sector;
    a first circuit block that receives a plurality of first data segments written in the plurality of first sectors from the host, executes generation of a first code, addition of the first code, and output of the first data segment to which the first code is added for each of the plurality of first data segments, calculates exclusive OR with respect to a group of first codes each generated from one of the plurality of first data segments, and outputs first information that is information obtained by calculation of the exclusive OR with respect to the group of the first codes;
    a second circuit block that receives a plurality of second data segments which is the plurality of first data segments each to which a first code is added and output from the first circuit block, and first information output from the first circuit block, executes data conversion and output of a third data segment which is a second data segment after the data conversion on each of the plurality of second data segments, calculates exclusive OR with respect to a plurality of third data segments each generated by the data conversion with respect to each of the plurality of second data segments, outputs a parity which is information obtained by calculating the exclusive OR with respect to the plurality of third data segments subsequently to the output of the plurality of third data segments, acquires a first code from each of the plurality of second data segments, calculates exclusive OR with respect to a group of second codes which are the first codes acquired from the plurality of second data segments, compares second information which is information obtained by the calculation of the exclusive OR with respect to the group of second codes with the first information, and outputs a result of comparison between the second information and the first information; and,
    a magnetic head that writes the plurality of third data segments output from the second circuit block to the plurality of first sectors and writes the parity output from the second circuit block to the second sector.

2. The magnetic disk device according to claim 1, wherein the second circuit block includes a first XOR circuit and
    a second XOR circuit having a circuit configuration similar to that of the first XOR circuit,
    the first XOR circuit calculates the exclusive OR with respect to the plurality of third data segments, and
    the second XOR circuit calculates the exclusive OR with respect to the group of the second codes.

3. The magnetic disk device according to claim 2, wherein the first XOR circuit and the second XOR circuit
    in a case where input of the plurality of second data segments from the first circuit block to the second circuit block is interrupted, interrupt calculation of exclusive OR, and
    in a case where the input of the plurality of second data segments from the first circuit block to the second circuit block is restarted, determines restart timing of calculation of exclusive OR and restarts calculation of exclusive OR at restart timing obtained by determination.

4. The magnetic disk device according to claim 3, wherein the group of the second codes is input to the second XOR circuit in synchronization with input of the plurality of third data segments to the first XOR circuit.

5. The magnetic disk device according to claim 1, wherein the data conversion includes error correction coding with respect to a second data segment, and
    the second circuit block executes error detection corresponding to the error correction coding on the parity and outputs a result of the error detection.

6. The magnetic disk device according to claim 2, wherein the data conversion includes error correction coding with respect to a second data segment, and
    the second circuit block executes error detection corresponding to the error correction coding on the parity and outputs a result of the error detection.

7. The magnetic disk device according to claim 3, wherein the data conversion includes error correction coding with respect to a second data segment, and
    the second circuit block executes error detection corresponding to the error correction coding on the parity and outputs a result of the error detection.

8. The magnetic disk device according to claim 4, wherein the data conversion includes error correction coding with respect to a second data segment, and
    the second circuit block executes error detection corresponding to the error correction coding on the parity and outputs a result of the error detection.

9. The magnetic disk device according to claim 1, further comprising:
    a controller that changes control with respect to the track according to a result of the comparison.

10. The magnetic disk device according to claim 2, further comprising:
    a controller that changes control with respect to the track according to a result of the comparison.

11. The magnetic disk device according to claim 3, further comprising:
    a controller that changes control with respect to the track according to a result of the comparison.

12. The magnetic disk device according to claim 4, further comprising:
    a controller that changes control with respect to the track according to a result of the comparison.

13. The magnetic disk device according to claim 5, further comprising:
    a controller that changes control with respect to the track according to a result of the comparison and a result of the error detection.

14. The magnetic disk device according to claim 6, further comprising:
    a controller that changes control with respect to the track according to a result of the comparison and a result of the error detection.

15. The magnetic disk device according to claim 7, further comprising:

a controller that changes control with respect to the track according to a result of the comparison and a result of the error detection.

16. The magnetic disk device according to claim 8, further comprising:
a controller that changes control with respect to the track according to a result of the comparison and a result of the error detection.

* * * * *